(12) United States Patent
Faust et al.

(10) Patent No.: US 6,376,126 B1
(45) Date of Patent: Apr. 23, 2002

(54) COMPOSITE BATTERY CONTAINER WITH INTEGRAL FLEXIBLE RIBS

(75) Inventors: Helmuth Faust, Brookfield; Edward N. Mrotek, Grafton; Dennis L. Marshall, New Berlin, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/418,203

(22) Filed: Oct. 13, 1999

(51) Int. Cl.[7] .............................. H01M 2/02; H01M 2/10
(52) U.S. Cl. ........................................ 429/176; 429/66
(58) Field of Search .................... 429/66, 176, 177, 429/208

(56) References Cited

U.S. PATENT DOCUMENTS

| | | |
|---|---|---|
| 3,607,440 A | 9/1971 | Daniel et al. ................ 136/166 |
| 4,061,228 A | 12/1977 | Johnson ....................... 206/454 |
| 4,076,787 A | 2/1978 | Ervin et al. .................. 264/250 |
| 4,309,818 A | 1/1982 | Kline ......................... 29/623.1 |
| 4,328,945 A | 5/1982 | Perkins ........................ 249/67 |
| 4,384,031 A | 5/1983 | Kline ........................... 429/176 |
| 4,427,617 A | 1/1984 | Oxenreider et al. ......... 264/296 |
| 4,939,047 A | * 7/1990 | Nagashima ................... 429/66 |
| 5,384,212 A | * 1/1995 | Heiman et al. .............. 429/143 |
| 5,558,958 A | 9/1996 | Mrotek et al. .............. 429/146 |
| 5,624,770 A | 4/1997 | Gummelt et al. ........... 429/143 |
| 5,731,103 A | 3/1998 | Olson et al. ................ 429/186 |

FOREIGN PATENT DOCUMENTS

| | | | |
|---|---|---|---|
| DE | 478 395 | | 6/1929 |
| DE | 478 395-c | * | 6/1929 |

* cited by examiner

Primary Examiner—Carol Chaney
(74) Attorney, Agent, or Firm—Foley & Lardner

(57) ABSTRACT

A composite battery container for housing one or more cell elements comprising positive and negative plates alternately interleaved with separator material includes a battery housing defining one or more cell compartments. The cell compartments have resilient, flexible spacer and plate-rest ribs integrally formed in the sides and bottom of the cell compartments, but having different material properties than the battery housing. The battery housing is made of a rigid, low cost plastic material, while the ribs are a flexible thermoplastic elastomer. The flexible ribs elastically deform when a cell element is disposed within the cell compartment and return to a substantially non-deformed, originally molded position when the cell element is removed. The ribs are formed in any suitable orientation and at any suitable acute or obtuse angle from the cell compartment walls.

17 Claims, 3 Drawing Sheets

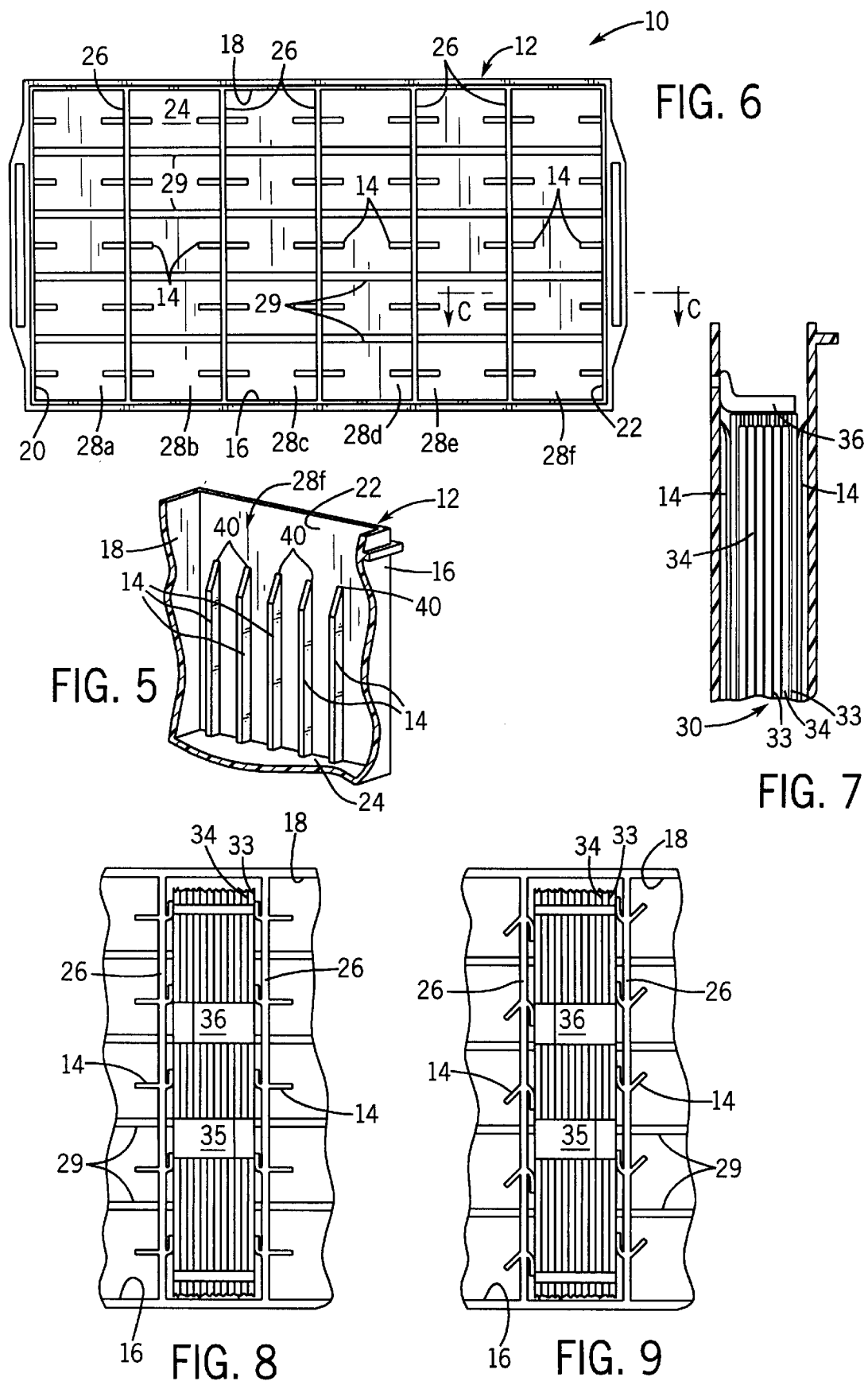

COMPOSITE BATTERY CONTAINER WITH INTEGRAL FLEXIBLE RIBS

CROSS-REFERENCE TO RELATED APPLICATIONS

STATEMENT REGARDING FEDERALLY SPONSORED RESEARCH OR DEVELOPMENT

BACKGROUND OF THE INVENTION

1. Field of the Invention

This invention relates to storage batteries, and more particularly, to a battery container having flexible ribs for positioning and supporting one or more battery cell elements in one or more cell compartments.

2. Description of the Prior Art

The cell elements of conventional storage batteries are formed of multiple positive and negative grids or plates coated with an electrochemical paste and interleaved with inert separator material to form plate stacks. The number and thickness of positive and negative plates in the plate stack as well as the number of cell elements determine a battery's energy capacity. Increasing the number of plates in the cell elements increases its energy capacity, while decreasing the number of the plates decreases its energy capacity. At the same time, increasing or decreasing the number and thickness of the plates also varies the overall thickness of the cell elements.

For multi-cell batteries, individual cell elements are disposed in cell compartments of a battery housing and are electrically connected together but remain physically separated. In order to ensure proper electrical connection and battery performance, the cell element must be securely disposed within the cell compartment. Partitions are formed in the battery housing to define the necessary cell compartment size for each cell element without being too big so that the cell element is unsecured or being too small so that the cell element does not fit or is damaged when inserted into the cell compartment. Since the overall battery thickness of the cell element varies according to energy capacity requirements and design parameters, manufacturers often maintain a large inventory of battery housings.

A number of methods have been devised to reduce the number of battery housings needed for various cell element sizes. Some manufacturers use a finite set of battery housings molded to define incrementally different-sized cell compartments and change the thickness of the plates and/or separator material as needed. For example, if a cell element has a small number of plates, then thicker separators are used to fill the cell compartments. However, the separation between the plates in the cell element should be consistent so that the resistivity between the plates is maintained constant. Changing the separator thickness, therefore, adversely affects the electrical performance of the battery.

Alternatively, a rigid spacer can be inserted around a cell element inserted into a larger cell compartment. This method requires that a number of spacers be molded to accommodate the difference in thickness between the various cell elements and cell compartments. U.S. Pat. No. 5,558,958 discloses an improvement upon a rigid spacer by using a flexible spacer, this spacer has a U-shaped sheet with vertical ribs molded of a flexible material such that the cell element can be inserted into the spacer and the spacer and cell element can then be inserted into the cell compartment as a unit. The ribs flex as needed according to the difference between the cell element and cell compartment thicknesses. The flexibility of the spacer allows it to be used with various sizes of cell elements and cell compartments. The flexible spacer also dampens vibrations, which adversely affect the electrical performance and life of the battery cell element.

Other manufacturers have horizontal or vertical ribs molded into the partition and end walls. These ribs are molded from the same polypropylene material forming the battery housing, and consequently, the ribs are stiff. Such ribs must be either molded or machined to precisely the correct dimension for each cell element thickness so that the cell element fits within the cell compartment without being damaged. Or, for such battery housings, the separator thickness must be varied, which degrades the performance of the battery, as mentioned above.

Battery containers have been designed with deformable ribs, as described in U.S. Pat. Nos. 3,607,440 and 4,309,818, the disclosures of which are hereby incorporated by reference as though fully set forth herein. These patents disclose battery housings having integrally molded ribs that deform as needed according to the thickness of the cell element. The deformable ribs compensate for variations in thickness of the cell element so that the number of different sized containers needed is reduced. The ribs are typically molded to the partition walls at an angle other than 90 degrees to reduce the amount of rib deformation as well as facilitate the insertion and removal of the cell elements. However, because the ribs are injection-molded of the same battery-grade polypropylene material as the battery housing, the ribs remain sufficiently rigid such that the battery elements could be damaged when inserted. Moreover, these ribs are not adequately resilient to spring back to their original position after prolonged deformation. Instead, the ribs tend to undergo mechanical creep and take on a permanent set in the deformed position, which further limits their flexibility. Additionally, these ribs do not dampen the vibrations commonly associated with use of a battery in automobiles, trucks, farm equipment or other off-road vehicles.

Battery containers also include rib-like projections or rests extending upward from the bottom of the container for supporting the cell elements. Rather than resting the cell elements on the bottom of the container, these projections are used so that electrolytic fluid can circulate through the cell element from the bottom. Typically, the plate rests are rigid and the plates of the cell elements are electrically connected at the top of the container to battery straps which are welded to opposing straps through the partition walls, as known in the art. Throughout the life of lead-acid batteries, the plates in the cell elements corrode and expand in size. Since the cell element is fixed in place at the top of the container, the plates tend to expand laterally and downwardly. However, the rigid plate rests limit the downward growth and cause the upper corners of the expanding plates to rotate upwardly about the strap connection points at the top of the container. This causes a number of problems that significantly decrease the operational life of the battery, such as electrical shorting, plate-buckling and contortion of the wires.

SUMMARY OF THE INVENTION

The present invention overcomes the deficiencies of the prior art and provides a composite battery container with one or more cell compartments having integral, flexible spacer ribs capable of securely retaining cell elements within a range of thicknesses. Furthermore, the battery container has flexible plate-rest ribs that deform to compensate for typical corrosive plate expansion.

Specifically, the present invention provides an improved battery container including a housing having side walls, end walls and a bottom. The walls and bottom define a single-cell compartment or a plurality of cell compartments. Multiple cell compartments are formed by at least one partition disposed within the space parallel with the end walls. The cell compartments are sized to hold a cell element comprising multiple positive and negative plates alternately interleaved with a plurality of separators. A plurality of resilient flexible spacer ribs are integrally formed with the end walls and/or the partitions to project into the cell compartments and center cell elements of various sizes within the cell compartments. The flexible spacer ribs deform elastically when the cell elements are within the cell compartments and return to an essentially non-deformed position when the cell compartments are empty. The flexible spacer ribs are integrally formed with the end walls, and with the partitions in multi-cell batteries, but their material properties differ.

The walls of the battery housing of the present invention can be made of a suitable sturdy material, such as battery grade polypropylene, while the spacer ribs can be made of a highly resilient, flexible material, such as a thermoplastic elastomer. Thus, the spacer ribs can be integral with the rigid housing, yet be highly flexible.

One object and advantage of the present invention is that the integral spacer ribs can center and secure cell elements of various sizes. This permits the use of one or few battery housing sizes for a wide range of energy capacities without the need for separate inserts. Also, the spacer ribs can be formed without excessive precision as to their length.

Another object and advantage of this invention is that the cell elements can be inserted and removed easily without being damaged. This is especially important for battery containers assembled on automated lines.

The spacer ribs can be molded in any orientation, including vertically, horizontally and diagonally, at a range of acute and obtuse angles from the end walls and partitions, including perpendicular. This and the flexibility of the spacer ribs provides the further object and advantage of a battery housing that can be easily molded and removed from the mold.

Still another object and advantage of this invention is to increase the battery's overall performance in use. The flexible spacer ribs significantly dampen the performance-degrading vibrations realized by the battery cell elements. Also, the spacer ribs permit the use of a single separator thickness. This promotes a consistent electrical resistance within the cell element and improves battery performance. In one embodiment where the spacer ribs are essentially parallel with the battery housing bottom, the ribs include interruptions spaced along their length. These interruptions improve the charging performance of the battery by promoting mixing of the electrolytic fluid, which reduces stratification of the sulfate in the electrolytic fluid.

The battery container can also include flexible plate-rest ribs, with or without the partition/end wall spacer ribs, integral with the bottom of the housing and projecting into the cell compartments to at least partially support the cell element. The plate-rest ribs are flexible so as to deform when the cell elements extend toward the bottom of the container due to corrosive expansion of one or more of the plates. This provides the additional object and advantage of a battery container that increases the operational life of the battery cell elements by compensating for the corrosive expansion of the plates and mitigating the related adverse effects. Further, although integral to the housing, the plurality of plate-rest ribs are preferably of a different material. This allows the housing to be constructed of sturdy, rigid battery-grade polypropylene and the ribs to be a resilient, flexible thermoplastic elastomer.

The foregoing and other objects and advantages of the invention will appear from the following description. In this description reference is made to accompanying drawings which form a part hereof and in which there is provided by way of illustration a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 5 is a perspective view of an alternate embodiment of the composite battery container of FIG. 1 cut away along line A—A of FIG. 1, showing vertical spacer ribs;

FIG. 6 is a top plan view of the composite battery container of FIG. 1 having vertical spacer ribs and flexible plate-rest ribs;

FIG. 7 is a cross-sectional view taken along line C—C of FIG. 6, showing a cell element within a cell compartment having vertical spacer ribs;

FIG. 8 is a top plan view of FIG. 7, showing a cell element within a cell compartment having vertical spacer ribs and flexible plate-rest ribs;

FIG. 9 is a top plan view of an alternate embodiment of the vertical spacer ribs of FIG. 5;

DETAILED DESCRIPTION OF THE PREFERRED EMBODIMENT

Figure 1:
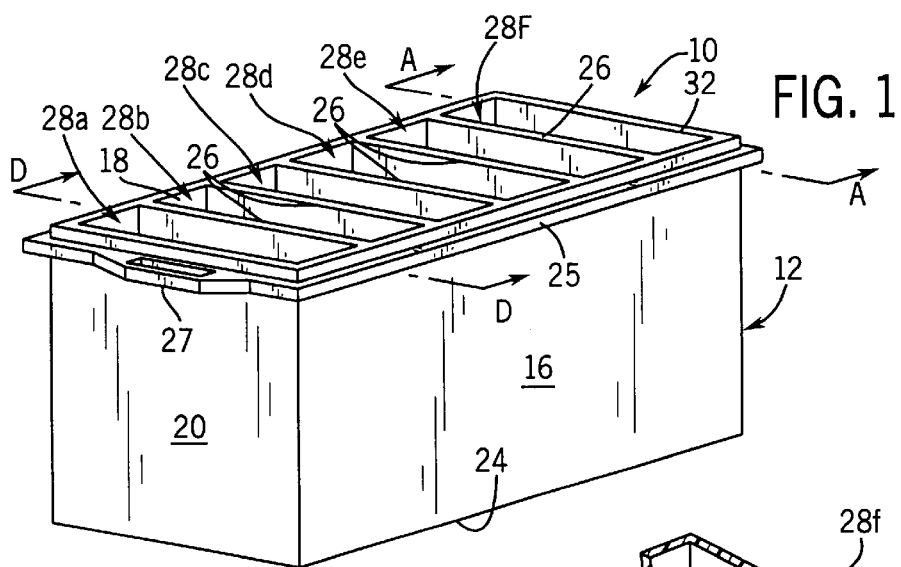
FIG. 1 is a perspective view of the composite battery container incorporating the flexible spacer and plate-rest ribs of the present invention.
Figure 2:
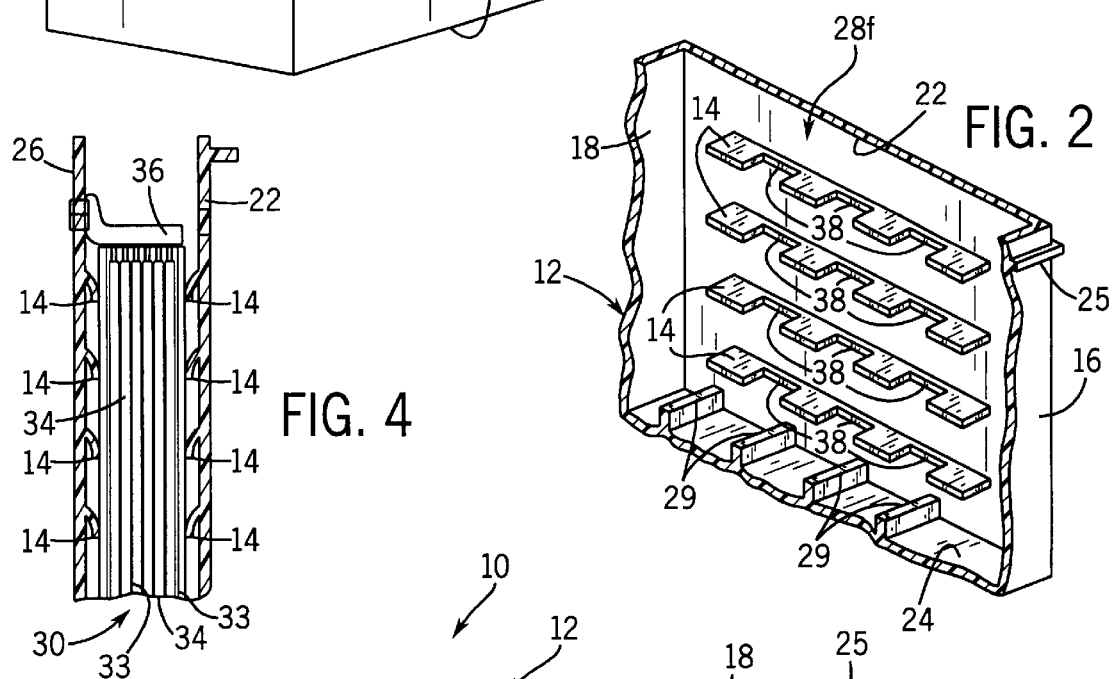
FIG. 2 is a perspective view of the composite battery container of FIG. 1 cut away along line A—A of FIG. 1, showing horizontal spacer ribs and flexible plate-rest ribs.

Referring to the drawings in detail, in particular FIGS. 1, 2 and 5, a battery container 10 includes a housing 12 and a plurality of flexible spacer ribs 14. The battery housing 12 has exterior side walls 16 and 18, end walls 20 and 22, and a bottom 24. A support ridge 25 extends around the perimeter of the housing 12 proximate an upper edge of the exterior of the side 16, 18 and end walls 20, 22, and defines slotted tabs 27 at the end walls. The bottom 24 has integral plate-rest ribs 29 extending between and generally perpendicular to the end walls 20, 22. The battery housing 12 is a generally rigid plastic material, such as battery grade polypropylene resin as is known in the art, and the spacer 14 and plate-rest 29 ribs are a highly resilient and flexible material, such as a thermoplastic elastomer. In particular, the ribs 14, 29 can be made of a suitable grade of "SARLINK" (a registered trademark of DSM Thermoplastic Elastomers, Inc. of Leominster, Me.), which is an elastomer based upon dynamically vulcanized rubber/thermoplastic blends containing a polypropylene component. Preferably, the container 10 is formed by simultaneously co-injection molding the two materials, as known in the art, so that the housing 12 and the spacer ribs 14 are integral with each other as are the housing 12 and the plate-rest ribs 29. The polypropylene component in the thermoplastic elastomer affords the integral union of the housing 12 and the ribs 14, 29 in the co-injection molding process.

For multi-cell batteries, the battery housing 12 also has partitions 26 evenly spaced along and perpendicular to the side walls 16, 18 forming a plurality of cell compartments 28 for holding multiple cell elements 30. The number and size of the cell compartments are set according to the number of partitions 26. In the preferred embodiment, as shown in FIG. 1, five partitions 26 define six equally sized cell compartments 28a–28f. The partitions 26 are generally flat, rectangular walls integrally formed with the side 16, 18 and end walls 20, 22 of the housing 12. The partitions 26 extend from the bottom 24 to an opening 32 at the top of the walls 16, 18, 20, 22. For single cell batteries, the walls form a single, non-partitioned cell compartment 28.

The cell elements 30, known in the art and commonly referred to as plate stacks, comprise a plurality of alternating positive 33 and negative 34 plates. The positive plates 33 are coated with an electrochemical paste and electrically connected together and to positive plates 33 of other cell elements 30 by straps 36, as is known in the art. Similarly, the negative plates 34 of the cell elements 30 are electrically connected by straps 35. Two straps 35, 36 are disposed in each cell compartment 28 and suitably fixed to the container 10 near the top of the partitions 26.

The plates 33, 34 are physically spaced apart from each other by inert separator material as is also known in the art. The cell elements 30 are disposed within the cell compartments 28 and set upon the plate-rest ribs 29. The cell compartments 28 are then partially flooded with an electrolytic fluid as is known in the art. It has been a common practice to vary the separator thickness, and thereby the overall thickness of the cell element 30, so that a small number of battery containers could hold cell elements 30 within a range of thicknesses. The present invention permits a single separator thickness to be used within the cell elements 30. This provides a consistent electrical resistivity among the cell elements 30 and improves the performance of the battery.

Integrally formed to the partitions 26 and the interior of the end walls 20, 22 are the plurality of spacer ribs 14. The ribs 14 project inwardly into each cell compartment 28 and can be formed to extend in any direction, including longitudinally, laterally or diagonally and spaced apart at any suitable distance. Two specific orientations are shown in the drawings, lateral or horizontal (FIGS. 2–4) and longitudinal or vertical (FIGS. 5–9).

Figure 3:
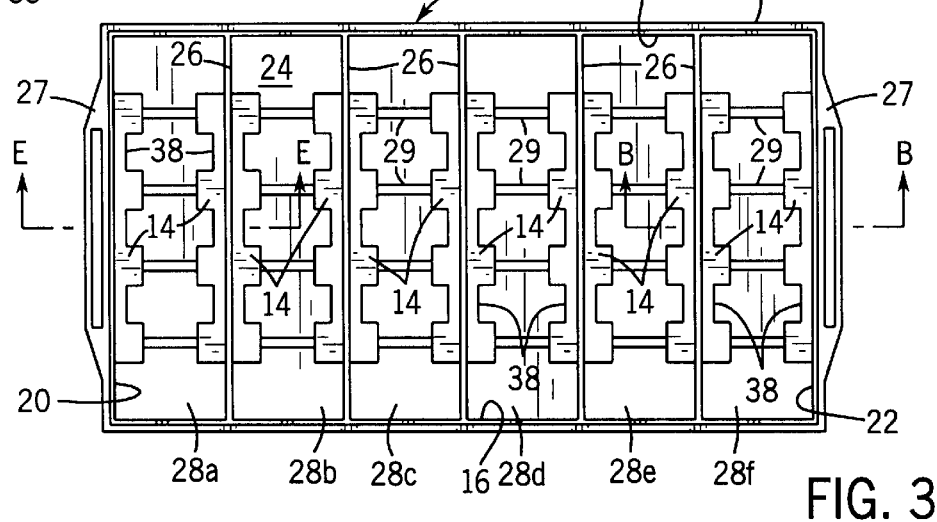
FIG. 3 is a top plan view of the composite battery container of FIG. 1 without cell elements and having horizontal spacer ribs and flexible plate-rest ribs.

Referring to FIGS. 2–3, the lateral spacer ribs 14 extend from proximate one end wall 20 to proximate the other 22, leaving a passage and reservoir for the electrolyte along the side walls 16, 18. The size of the spacer ribs 14 is set according to the core thickness of the cell compartments 28, approximately ¼ inch for most standard battery energy capacities. The number of spacer ribs 14 is set according to the longitudinal height of the partitions 26. For example, a typical battery container 10 would have four horizontal spacer ribs 14 evenly spaced from the bottom 24 of the housing 12. A battery housing 12 having a greater or lesser core depth could have more or less than four horizontal spacer ribs 14, respectively. The horizontal spacer ribs 14 include lateral interruptions 38 spaced throughout the spacer ribs 14 to allow passage of electrolyte. The interruptions 38 can extend the full height of the spacer ribs 14 or some amount less than full height, as shown in FIG. 2. The interruptions 38 act to allow gas produced during the charging process to mix the electrolyte and reduce sulfate stratification along the bottom of the cell compartments 28, which can degrade battery performance. The interruptions 38 can be spaced to stagger (not shown) from one spacer rib 14 to the next so as to further promote turbulence within the electrolyte.

Referring to FIG. 5, 6 and 8, longitudinal or vertical spacer ribs 14 extend from the bottom 24 toward the opening 32 approximately two-thirds of the longitudinal dimension of the partitions 26. The spacer ribs 14 have chamfered upper ends 40 angling downward toward the center of the cell compartments 28, which facilitates insertion of the cell elements 30 into their respective compartments 28. The vertical spacer ribs 14 are approximately ¼" for most batteries, but can be varied based on the core thickness of the cell compartment 28. The number of vertical spacer ribs 14 is set according to the lateral dimension between the side walls 16 and 18. For example, a typical five-inch-wide battery housing would have five vertical ribs 14, as shown. The vertical spacer ribs 14 are set off from the side walls 16, 18 and spaced apart at equal distances from each other.

In FIGS. 2–8, the spacer ribs 14 are shown oriented longitudinally or laterally and formed to project at right angles from the partitions 26 and end walls 20, 22. As mentioned, however, the spacer ribs 14 may extend diagonally across the interior lateral surfaces of the cell compartments 28. Also, the spacer ribs 14 may be formed uniformly or alternately at acute and obtuse angles from the partitions 26 and end walls 20, 22 as desired. For example, all of the spacer ribs 14 may project downwardly toward the bottom 24 or to one of the side walls 16, 18. Horizontal spacer ribs 14 angled downward provide a resultant force acting to retain or lock the cell elements 30 within the cell compartments 28. Or, as shown in FIG. 9, opposing spacer ribs 14 on the partitions 26 may resemble a wishbone configuration. The spacer ribs 14 may also extend perpendicular from the end walls 20, 22 and partitions. Perpendicular spacer ribs 14 have a wide angle through which to flex, and therefore, provide significant vibration dampening as well as facilitate removal from the mold (not shown).

Figure 4:
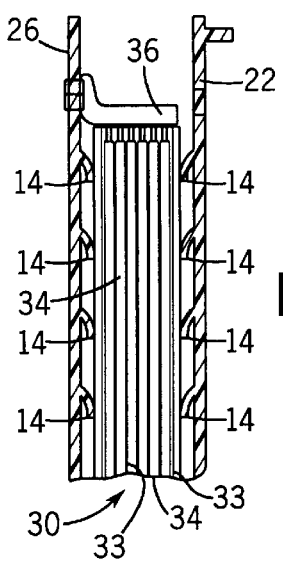
FIG. 4 is a cross-sectional view taken along line B—B of FIG. 3, showing a cell element within a cell compartment having horizontal spacer ribs.

Referring to FIGS. 4 and 7, when the cell elements 30 are disposed within the cell compartments 28, the spacer ribs 14 flex as needed according to the size of the cell elements 30 and the cell compartments 28. Perpendicular horizontal spacer ribs 14 flex longitudinally downward when the cell element 30 is in the compartment 28, as shown in FIG. 4, while vertical spacer ribs 14 flex laterally in either direction, as shown in FIGS. 7 and 8. The spacer ribs 14 act to take up space between each cell element 30 and the partitions 26 or end walls 20 and 22. Thus, cell elements 30 within a range of thicknesses can be inserted into cell compartments 28 of a single battery container 10 without removing material or adding separate spacers.

The high flexibility of the thermoplastic elastomer material allows the spacer ribs 14 to flex as needed according to size of the cell element so as to receive a wide range of cell element 30 sizes. Since the spacer ribs 14 are flexible, rather than rigid, when the cell elements 30 are in place, the spacer ribs 14 reduce performance-degrading vibrations to the battery. This is particularly important when the battery is used in trucks, farm equipment or other off-road vehicles. Moreover, material properties of the thermoplastic elastomer material allow the spacer ribs 14 to elastically deform when and while the cell elements 30 are inserted in place. Since the spacer ribs 14 do not plastically deform, they do not take on a permanent set in a fully or partially deformed position, allowing the spacer ribs 14 to retain their sizing and vibration-dampening characteristics.

Figure 10:
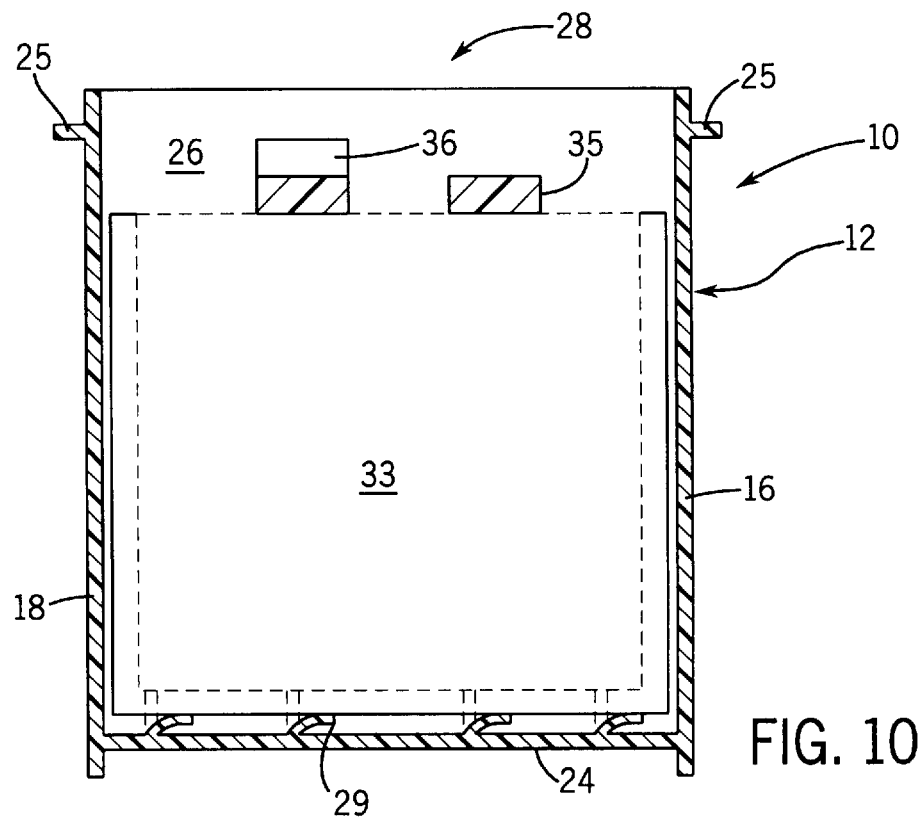
FIG. 10 is a cross-sectional side view taken along line D—D of FIG. 1, showing a cell compartment with a cell element having expanded plates deforming the plate-rest ribs.
Figure 11:
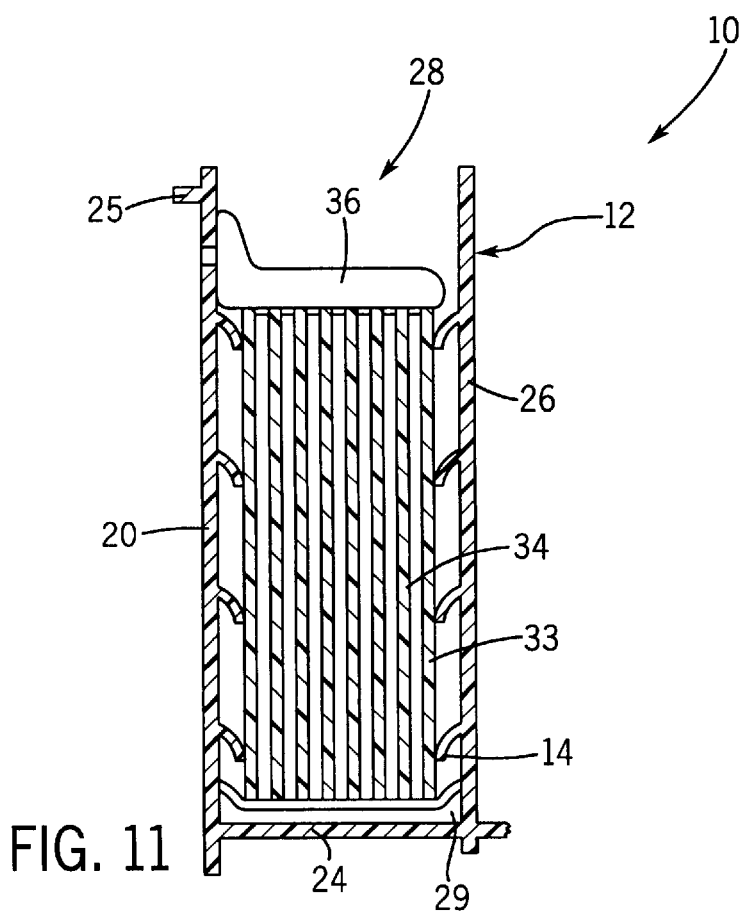
FIG. 11 is a cut-away cross-sectional side view taken along line E—E of FIG. 3, showing the cell element of FIG. 10 having expanded plates deforming the plate-rest ribs.

Referring to FIGS. 2, 10 and 11, the plate-rest ribs 29 extend upwardly from the bottom 24 of the housing 12 from one end wall 20 to the other 22. The plate-rest ribs 29 are approximately ¼" for most batteries, but can be varied based on the size of the cell element 30 and container 10. The number of plate-rest ribs 29 is set according to the lateral dimension between the side walls 16 and 18. For example, a typical five-inch-wide battery housing would have four plate-rest ribs 29, as shown in the figures. The plate-rest ribs 29 are set off from the side walls 16,18 and spaced apart at equal distances from each other.

Referring to FIGS. 4, 7, 10 and 11, a cell element 30 is partially supported by the plate-rest ribs 29 and is also attached to straps 35, 36 welded at its top. This attachment and the spacer ribs 14 also act to support the cell element 30 so that the entire weight of the cell element 30 is not acting on the plate-rest ribs 29. As shown by the hidden lines in FIG. 10, when a properly sized unused or uncorroded cell element 30 is in the cell compartment 28 the plate-rest ribs 29 extend upwardly in a generally non-deformed state. Like the spacer ribs 14, the plate-rest ribs 29 are integral with the housing 12, and are soft and flexible so that they will deform as the plates 33, 34 of the cell elements 30 corrode and expand longitudinally. The spacer ribs 14 also compensate for the change in thickness of the cell element as its plates 33, 34 become corroded. Again, like the spacer ribs 14, the plate-rest ribs 29 are preferably a different material than the housing 12, such as a thermoplastic elastomer. The invention is not limited in this regard, however, as the plate-rest ribs 29 and housing 12 may be of the same material, with the plate-rest ribs 29 having a different duramenter so that they are sufficiently flexible. With reference to FIG. 11, at some point when the plates 33, 34 are significantly corroded and expanded, the plate-rest ribs 29 can no longer deform to provide further downward growth. Then, the plates 33, 34 may indent the surface of the plate-rest ribs 29 so as to continue extending downward.

The plate-rest ribs 29 allow the plates 33, 34 to expand downwardly so that the cell element 30 does not push upward and rotate about the fixed straps 35, 36 at the top of the container 10. This dramatically increases the operational life of the battery and reduces buckling of the plates 33, 34. The flexible plate-rest ribs 29 also reduce damage to the separators and battery wires and help retain active material. All of this further reduces the likelihood that the positive 33 and negative 34 plates would cause an electrical short by directly contacting each other.

Illustrative embodiments of the invention has been described in detail for the purpose of disclosing a practical, operative structure whereby the invention may be practiced advantageously. The apparatus described is intended to be illustrative only. The novel characteristics of the invention may be incorporated in other structural forms without departing from the scope of the invention as defined in the following claims. For example, ribs 14 may be disposed at the side walls 16, 18, instead of, or in addition to, being at the end walls 20, 22 and partitions 26.

Thus, to apprise the public of the full scope of the present invention, the following claims are made:

We claim:

1. An improved battery container including a housing having side walls, end walls and a bottom joined to define at least one cell compartment sized to receive a cell element of variable thickness, the cell element comprising a plurality of alternating positive and negative plates interleaved with a plurality of separators, the cell element being generally positioned at a center of the at least one cell compartment by a plurality of resilient, flexible spacer ribs formed as a unitary part of the housing and projecting into the at least one cell compartment, the improvement wherein:

the housing and the plurality of flexible spacer ribs are different materials.

2. The improved battery container as recited in claim 1, further comprising at least one partition of the same material as the housing and disposed within the cell compartment parallel to the end walls so as to define a plurality of cell compartments, the at least one partition having a plurality of the flexible spacer ribs extending into the plurality of cell components.

3. The improved battery container as recited in claim 1 wherein the spacer ribs extend substantially from the bottom to a top edge of the end walls.

4. The improved battery container as recited in claim 3 wherein the spacer ribs have a chamfered upper end angling downwardly toward the center of the cell compartment.

5. The improved battery container as recited in claim 1 wherein the spacer ribs extend substantially from one side wall to the other side wall.

6. The improved battery container as recited in claim 5 wherein the spacer ribs are perpendicular to the end walls.

7. The improved battery container as recited in claim 5 wherein the spacer ribs angle toward the bottom of the housing.

8. The improved battery container as recited in claim 5 wherein the spacer ribs angle away from the bottom of the housing.

9. The improved battery container as recited in claim 5 wherein the spacer ribs include interruptions spaced along their length, the interruptions acting as baffles to promote mixing of electrolyte disposed within the cell compartments.

10. The improved battery container as recited in claim 1 wherein the housing is a polypropylene material and the spacer ribs are a thermoplastic elastomer material.

11. The improved battery container as recited in claim 1 further comprising a plurality of flexible plate-rest ribs formed as a unitary part of the bottom of the housing and projecting into the at least one cell compartment to at least partially support the cell element, the plurality of plate-rest ribs being of a different material than the housing.

12. An improved battery container including a housing having side walls, end walls and a bottom joined to define at least one cell compartment sized to receive a cell element of variable thickness, the cell element comprising a plurality of alternating positive and negative plates interleaved with a plurality of separators, the cell element being at least partially supported by a plurality of plate-rest ribs formed as a unitary part of the bottom of the housing and projecting into the at least one cell compartment, the improvement wherein:

the plurality of plate-rest ribs being flexible so as to deform when the cell elements extend toward the bottom of the container due to corrosive expansion of one or more of the plates.

13. The improved battery container of claim 12, wherein the housing and the plurality of plate-rest ribs are different materials.

14. The improved battery container of claim 12 further comprising a plurality of flexible spacer ribs formed as a unitary part of the housing and projecting into the at least one cell compartment, wherein the plurality of spacer ribs are a different material than the housing.

15. The improved battery container as recited in claim 14, further comprising at least one partition of the same material as the housing and disposed within the cell compartment parallel to the end walls so as to define a plurality of cell compartments, the at least one partition having a plurality of the spacer ribs extending into the plurality of cell compartments.

16. The improved battery container as recited in claim 1 wherein the plate-rest ribs extend along the bottom from substantially one side wall to the other side wall.

17. The improved battery container as recited in claim 1 wherein the housing is a polypropylene material and the plate-rest ribs are a thermoplastic elastomer material.

* * * * *